United States Patent [19]

Diosady et al.

[11] Patent Number: 4,859,371

[45] Date of Patent: Aug. 22, 1989

[54] EXTRACTION OF PARTICULATE MATERIALS

[75] Inventors: Levente L. Diosady, Willowdale; Leon J. Rubin, Toronto; Csaba G. Tar, Mississauga, all of Canada

[73] Assignee: The University of Toronto Innovations Foundation, Toronto, Canada

[21] Appl. No.: 43,868

[22] Filed: Apr. 29, 1987

[51] Int. Cl.$^4$ ................................................. C11B 1/10
[52] U.S. Cl. ............................... 260/412.4; 260/412.2; 260/412.3
[58] Field of Search ................ 260/412.2, 412.4, 412.3

[56] References Cited

U.S. PATENT DOCUMENTS 4,370,274  1/1983  Finch et al. ...................... 260/412.3
4,460,504  7/1984  Rubin et al. ................. 260/412.2 X Primary Examiner—Werren B. Lone
Assistant Examiner—Vera C. Clarke
Attorney, Agent, or Firm—Wyatt, Gerber, Burke and Badie

[57] ABSTRACT

A method of extracting components from particulate materials is disclosed. The method includes the steps of mixing the particles with a first extraction solvent to provide a slurry. The slurry is then passed through an extraction zone. A second extraction solvent is passed countercurrently to the slurry through the extraction zone. The second solvent has a different density from the first solvent and is substantially immiscible with the first solvent. This process is particularly beneficial for use in the extraction of ground oil-seed particles.

20 Claims, 1 Drawing Sheet

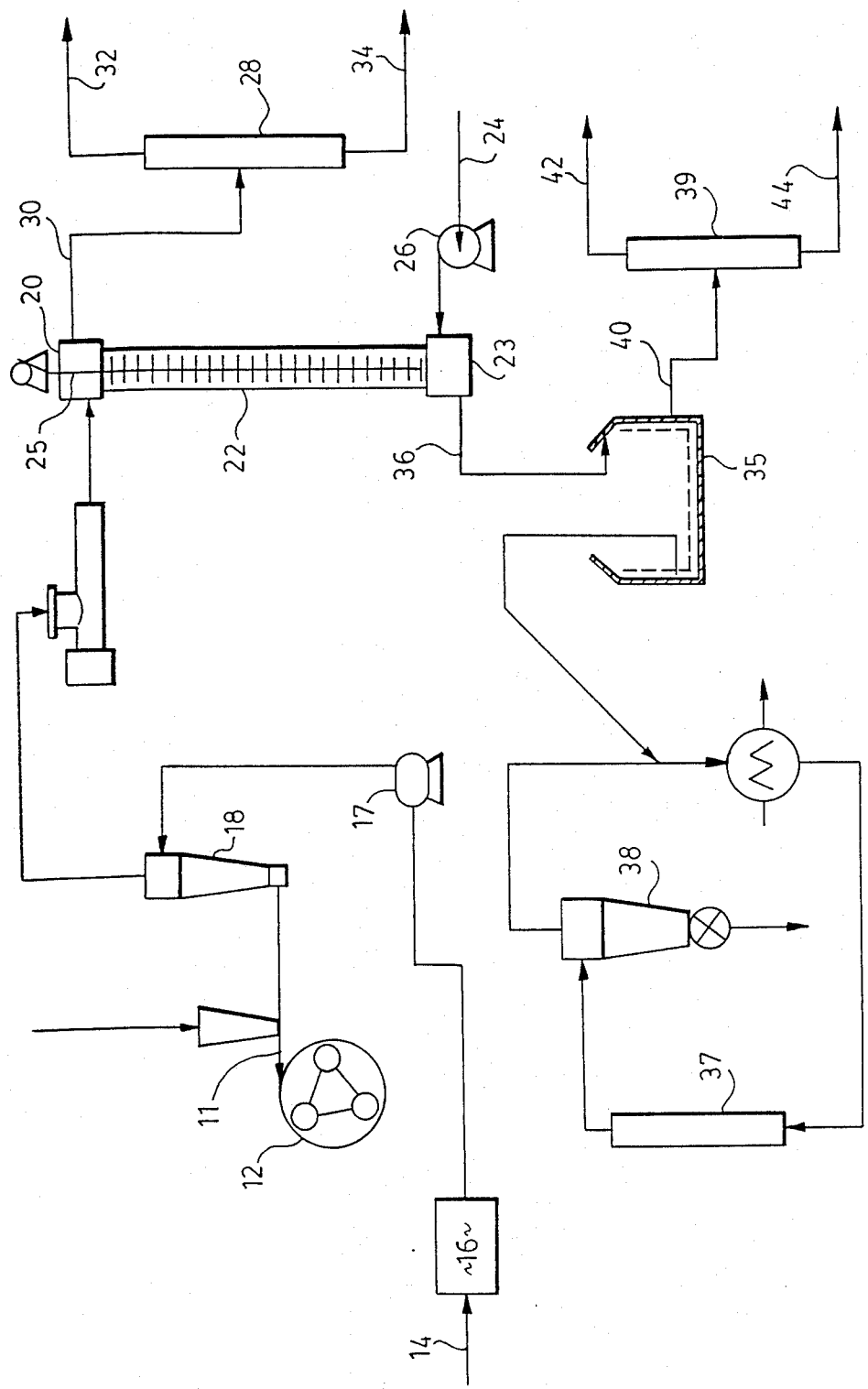

EXTRACTION OF PARTICULATE MATERIALS

BACKGROUND OF THE INVENTION

This invention relates to solvent extraction and more particularly to solvent extraction of a solid using two mutually immiscible solvents.

Solvent extraction by two solvents is frequently used in the processing of oilseeds. In a typical process, the seed is extracted with hexane after suitable treatment to isolate triglyceride oil. The residue after extraction contains polar compounds present in the oilseeds which detract from their usefulness. These compounds are generally removed by subsequently extracting the residue with a polar solvent such as alcohol Methods of extracting soybean meal are disclosed in U.S. Pat. No. 3,878,232 (1975) (Haynes and Simms) and U.S. Pat. No. 3,816,389 (1974) (Mihara et al).

Generally, for oil extraction of oilseeds conventional extractors contact the seeds with extracting solvent by percolating the extracting solvents through the seeds.

The early extractors were of the batch type, and they are still in use for the recovery of oil from oilseeds or mechanical press residues. In modern plants, however, batch equipment is used principally in the form of small units for the recovery of pharmaceutical oils, fish-liver oils, or other expensive oils. A common extractor has been described by Goss (Oil and Soap, 23, 348–354, 1946).

As a result of the shortage of fats and oils after World War I, the Germans sought better ways to extract Manchurian soybeans, and two continuous extractors were developed. The Bollman or basket extractor was patented in Germany in 1919 and 1920 (H. Bollman, German Pat. Nos. 303,846 (1919) and 322,446 (1920); British Pat. No. 156,905 (1921)), and the Hildebrand U tube extractor was patented in 1931–34 (K. Hildebrand, German Pat. Nos. 528,287 (1931) and 547,040 (1932); U.S. Pat. No. 1,961,420 (1934). In recent years the Bollman percolation-type extractors became dominant in the oilseed industry for seeds that have been rolled into thin flakes.

A rotary-type percolation extractor was developed by Blaw-Knox (now Dravo) and called the "Rotocel" (Karnofsky, JOACS, 26, 570–574, 1949, Chem. Eng., 57, 108–110, 1950; McCubbin and Ritz, Chem. Ind., 66, 35–56, 1950). It carries baskets in a rotary motion in a single horizontal plane. Miscella percolates through the baskets and falls into compartments in the bottom of the extractor housing, where it is picked up by a series of pumps and recirculated countercurrently to the flakes. Current models have capacities of up to 3,000 tons per day of soybean. This type of extractor is licensed by Simon-Rosedown and Krupp (Bailey's Industrial Oil and Fat Products, editor D. Swern, 1982, Vol. 1, p. 234).

An alternative design is the French stationary basket extractor, licensed by Speichem (Milligan, JAOCS, 53, 286–290, 1976), in which the liquid manifolds and solid hopper rotate, and the cells and perforated doors are fixed. These also reach capacities of 3000 tons/day for soybean.

The De Smet extractor (Extraction De Smet, S. A., Edegen, Antwerp, Belgium) uses a horizontal endless perforated belt.

The Crown (Crown Iron Works Company, Minneapolis, Minn.) extractor employs percolation combined with immersion. It consists of a chain conveyor unit in which a double drag chain and flight move inside a stationary casing, conveying the solids over sections of screen. Some of the units now have the capacity to handle up to 2,000 tons per day of soybeans.

A fifth type of percolation extractor is the FILTREX solvent extraction system, which is of the horizontal rotary filter type. It is made by Wurster and Sanger (Wurster and Sanger, a Division of Jacobs Engineering Company, Chicago, Ill. The advantages claimed for this extractor include low fines in the miscella, superior-quality crude oil, and less solvent to evaporate from the meal (Decossas et al., Ind. Eng. Chem., 49, 930–935, 1957; Haines et al., Ind. Eng. Chem., 49, 920–929, 1957).

A new approach to enhance extraction efficiency is to apply the solvent in vapour form, so as to penetrate the interstices of the material and to condense therein as well as on the external surfaces of the material (Lloyd, British Pat. No. 1,129,165 (1967)). The apparatus consists of a cylindrical container, a disk in the form of a perforated plate, or a mesh, which permits the passage of miscella but prevents the passage of the oil-bearing material. A plough is used to force the material radially on the moving disc to be discharged through an opening in the container wall.

Conventional extractors rely on the integrity of the seed bed for solid-liquid contact, and separation of the phases. They cannot handle finely divided seed material at an acceptable flowrate. Seeds with a high oil content generally need to be prepressed and flaked to be used in conventional systems.

Attempts were made to develop a counter-current leaching process by allowing solid seed particles to move through the solvent by gravity. U.S. Pat. Nos. 2,112,805 (1938), 2,156,236 (1939) and 2,148,248 (1939), all issued to Bonotto, disclose an extractor having a column divided into a number of sections by a revolving assembly of horizontal plates attached to a control shaft. The plates are provided with a series of slots through which the flakes proceed downwardly by gravity, countercurrent to a rising flow of solvent. Stationary scraper arms placed just above each plate provide gentle agitation of the mass to prevent packing and assist in moving the flakes through the holes. In the original patent a screw discharge mechanism is described. For seeds other than soybeans, the discharge mechanism is unsatisfactory and has been replaced generally by a drag-link conveyor.

The Anderson extractor (U.S. Pat. No. 2,663,623 (1953)) was a modification of the Bonotto apparatus. Because of problems with the fine particles in the miscella, it operated more successfully on prepressed cake.

The extraction of oilseeds with solvents that are only partially miscible with oil is the basis of several patents. In these processes the extraction solvent separates from the extracted oil due to increased water content (Cavanagh and Couche, British Pat. No. 1,081,640 (1967) and U.S. Pat. No. 3,295,985 (1966)), or due to decreased oil solubility at decreased temperatures (Youn and Wilpers, U.S. Pat. No. 4,208,540 (1981)).

In the above-mentioned Cavanagh and Couche patent the hydrophilic solvent mixture enters the first of a series of extraction stages as a single phase, and separates into two phases in later stages due to the dissolution of water present in the seed. Although the process gave poor oil recovery and oil quality, it did extract some polar components from the seed in addition to oil. The process has not been used commercially.

The extraction of a soluble component from one solvent into another immiscible liquid is an important unit operation. The simplest form of liquid-liquid contactor allows the droplets of one liquid to flow up or down through a continuous phase of another by gravity. The principle of adding pulsating mechanical energy to increase the degree of turbulence and decrease the droplet size was originated in 1935 by Van Dijck (U.S Pat. No. 2,011,186), who proposed the pulsing of the liquid flow or the introduction of a reciprocating plate into the column. In the early 1950's three types of columns were introduced:
(i) the rotating disc column (Reman and Olney, Solvent Extraction Symposium, Annual Meeting of American Institute of Chemical Engineers, 1954).
(ii) the Scheibel column (U.S. Pat. No. 2,850,362 (1958), U.S. Pat. No. 3,389,970 (1968)).
the Oldshue-Rusthon column (Chem. Eng. Progr., 49,297 (1953)), followed in the 1970's by the Kuhni extraction column.

The reciprocating-plate technique had been neglected until the late 1950's. In 1959 Karr (AICHEJ, 5, 446) reported data on a 76 mm diameter open-type perforated reciprocating-plate column. The column was further developed (Karr and Lo (Chem. Eng. Progr., 72/ 68 (1976)). Interest in this type of column has increased in the past two decades. Most of the published data have lent support to the conclusion that reciprocating-plate columns generally have high volumetric efficiencies. A further development in extractors of this type is the multistage vibrating disk column, introduced by Tojo et al. (Chem. Eng. Sci., 33, 601 (1978)).

It is an object of the present invention to provide an improved method of extracting oilseeds.

Accordingly, the invention provides a process of extracting components from solid particulate matter. The first step of the process is to mix the particles with a first extraction solvent to provide a slurry. The slurry is then passed through an extraction zone. A second extraction solvent is passed countercurrently to the slurry through the extraction zone. The solvents have different densities, permitting countercurrent movement by gravity. The two solvents are substantially immiscible.

In the extraction zone, one solvent flows downwardly and the other solvent flows upwardly through the first solvent due to the specific gravity differences therebetween. The particles are thereby contacted by both solvents simultaneously to remove components therefrom. The particles can be carried by either solvent and are preferably separated from the carrier solvent, and desirable components extracted from the particles can subsequently be recovered from the solvents after extraction, if desired.

Preferably one of the solvents is polar and the other solvent is non-polar. The presence of a polar solvent, often increases the extraction rate of non-polar components into the non-polar solvent.

This process is applicable to any particles which need to be extracted by two immiscible solvents, but is particularly suitable to the extraction of oil-bearing seeds.

BRIEF DESCRIPTION OF THE DRAWING

A preferred embodiment of the invention will now be described, by way of example only, with reference to the following figure which is a schematic illustration of a process to extract solid particles.

DESCRIPTION OF THE PREFERRED EMBODIMENTS

In the system shown in the figure, oilseed is being extracted with a polar solvent and a non-polar solvent. The density of the polar solvent is greater than the density of the non-polar solvent. Oilseed is fed through line 11 to a mill 12 wherein it is ground. The ground seed particles are further mixed with polar solvent from feed line 14 in a mixing zone 16. The resultant slurry is pumped by pump 17 through a cyclone 18 which separates large seed particles from the slurry for regrinding in the mill 12 and is then pumped through the top 20 of an extracting column 22. The non-polar solvent is pumped through feed line 24 by a pump 26 and into the bottom 23 of this column 22. The column is agitated by an agitation mechanism 25, and the heavier polar solvent moves downwardly by gravity with the ground seed particles entrained therein, and the non-polar solvent flows upwardly. The non-polar solvent with non-polar components dissolved therein (the miscella) is recovered at the top 20 of the column, and is sent to a solvent recovery unit via line 30 wherein it is separated into a non-polar solvent fraction 32 and an oil fraction 34. The polar solvent with dissolved components therein and the entrained seed particles leave the bottom 23 of the column 22 and are charged into a filter 35 through line 36. The solid particles are then washed in the filter with solvent sent to a dryer 37 and an air cyclone 38 to separate air and solid particles. The polar solvent with dissolved components therein is fed to a solvent recovery unit 39 through line 40, where it is separated into a polar solvent fraction 42 and waste material fraction 44.

In the above example, the seed particles were carried by the polar solvent as they were ground with this solvent. Generally, there are two critera for deciding which solvent should be the carrier solvent. One criterion is that the particulate material should be carried by the solvent with which it requires the least contact, so that it is contacted countercurrently with the other solvent for more vigorous contact therewith. The other criterion is that the particulate material should be carried by whichever solvent it is closest to in density to ensure that the material remains suspended as much as possible. Thus, the particles can either be fed in the bottom or the top of the column, depending on the specific gravity of the carrier solvent for the particles.

One solvent may be dispersed in the other by means of a sparger or the like to increase the surface area for contact of the particle by the one solvent.

The extraction column 22 preferably used with the preferred embodiment of the invention is either a Karr or a York-Scheibel colunmn. However, any suitable extraction column can be used. The mill 12 is preferably a Szego mill produced by General Comminution Inc., Toronto, although other mills known in the art capable of grinding seed can be used.

The process of the present invention is advantageously used to extract seeds such as rapeseed, soybean, cottonseed, sunflower seed, peanuts and mustard seed. These seeds are either ground, flaked, pre-pressed, cracked or broken. They may be dry-ground or slurry-ground in the carrier solvent.

A method of extraction which can be suitably adapted to be used with the process of the present invent is described in U.S. Pat. No. 3,878,232 (Haynes and Simms), the contents of which is incorporated herein by reference. Haynes and Simms describe a six-stage extraction system where the first three stages extract the oil from soybeans with hexane and the last three stages use aqueous ethanol to remove undesirable polar compounds, such as some carbohydrates. In the present invention these extractions are carried out simultaneously.

U.S. Pat. No. 3,816,389 (Mihara et al), the contents of which are incorporated by reference also discloses a suitable extraction method. This Mihara patent discloses a process wherein soybean or rice bran is ground in the presence of methanol, ethanol, acetone, or their mixtures, in order to remove the undesirable polar constituents and precondition the material for subsequent oil extraction. After solid-solvent separation, the material is extracted with hexane to recover the oil from the meal. Again, this could be done simultaneously in the process of the present invention.

A method developed by the inventors of the present invention for the treatment of rapeseed simultaneously with methanol-ammonia and hexane is suitably adaptable to be used with the present invention. This process is described in U.S. Pat. No. 4,460,504 issued July 17, 1984 to Rubin et al., Can. Inst. Food Sci. Technol. J. 19. 57, 1986, and Diosady et al, Can. Inst. Food Sci. Techol.; J. 18, 121, 1985, the contents of all of which are incorporated herein by reference.

Advantageously, with the process of the present invention, one of the solvents that is used is polar and is suitably selected from methanol, ethanol, isopropanol, acetone, and mixtures and aqueous solutions thereof.

The other solvent is preferably a non-polar solvent. The non-polar solvent is advantageously selected from $C_5$ to $C_8$ aliphatics, ether, freon and other halogenated hydrocarbons. Generally, hexane is the most suitable lower alkane for extraction of oilseeds.

The ratio of polar solvent to seed is preferably between 0.5:1 and 10:1 (v/w), more advantageously between 2:1–3:1 and most preferably about 2.5:1. In the case of rapeseed, the rapeseed is preferably ground with MeOH/NH$_3$/H$_2$O in a ratio of 2.5:1 and is then diluted with MeOH/NH$_3$/H$_2$O to a ratio of between 4:1 and 7:1. The ratio of non-polar solvent to seed is preferably from 1:1 to 10:1 (v/w), more preferably between 2.5:1–6.7:1 and most preferably 4:1. The median particle size of the seed particles is between 50–1000 μm and most preferably is between 11514 460 μm.

Either the first solvent or the second solvent can be the continuous phase, and the other phase discontinuous and dispersed within the first phase.

EXAMPLE 1

Canola seed was ground with methanol containing 10% water (v/v) in a Szego mill at a solvent-to-seed ratio (R) of 2.5 (v/w). The slurry was diluted with the same solvent mixture to R=4.0, because R=4 gives improved extraction of the polar components of seed. For example for each 4 kg of seed, 10 liters of methanol-water was used for grinding and an additional 6 was added for dilution and extraction. For the countercurrent liquid/liquid/solid extraction a Karr column 5 cm in diameter and 1.83 m in effective extraction length was used. The slurry inlet and outlet tanks were agitated by plates spaced at 2.5 cm intervals. For the rest of the column a 5 cm spacing was used. At the start of the process the extractor was filled with hexane and methanol/water at a ratio of 1 to 1. The column agitator was started and adjusted to 100 to 110 pulsations per minute with a stroke length of 3.8 cm.

The process was carried out such that the methanol/water was continuous and the hexane was discontinuous.

The flowrates of hexane and the polar phase, and also the hexane-to-seed ratio were adjusted for runs 1 to 6, as illustrated in Table 1. The meal content of the slurry was removed by decanting, washed with MeOH followed by hexane, and dried.

The oil content in the meal, miscella (non-polar solvent), and in the polar solvent (MeOH/H$_2$O) were determined. The results are presented in Table 2. The protein content of meals, produced by the Karr column is also given in Table 2. The analysis was performed using the AACC procedure (AACC, 1976). The process resulted in an overall oil extraction efficiency, defined as oil removed from the seed, of 96% with oil recovery in the hexane phase in excess of 94%.

EXAMPLE 2

The procedure described in Example 1 was followed using methanol containing 5% v/v water and 10% NH$_3$ w/w (see U.S. Pat. No. 4,460,504, Rubin et al.) as the polar solvent. The median particle size of the ground seed was varied by changing the solvent-to-seed ratio in the mill between R=1.25 and R=3.33, and by changing the rotor speed and the throughput rate. A median particle size range between 115 and 460 μm was obtained. Larger median particle size values were due to the presence of large fractions of unground seed in the product. Most efficient grinding was obtained at R=2.1–2.5, and R=2.5 was used in most subsequent experiments. The observed median particle size was 355 μm.

In all cases, the ground slurry was diluted to R=6.7 and allowed to react for 5–15 minutes. The glucosinolate content of the resultant meal was 2 μmoles/gram, the phytate content was 3.8%, the phenolics decreased by 3% to 300 mg/kg while the crude protein content of the meal was 50.9%.

EXAMPLE 3

Continuous runs were performed using a Karr column of 10 cm diameter and 1.73 m effective extraction length, according to the scheme shown in FIG. 1. MeOH/NH$_3$/H$_2$O is used as the polar phase as in Example 2. The column operating conditions for runs 1 to 5 are shown in Table 3.

Table 4 summarizes the oil contents in the miscella, the meal, and polar MeOH/ammonia/H$_2$O phase. The residual oil in the meal was less than 0.5%. Although the oil content of the polar solvent phase is low, it would be necessary to re-extract it with hexane. The overall extraction efficiency of these runs were higher than 99.5%. The protein content of meals for runs 1 to 5 are also gi in Table 4.

EXAMPLE 4

The process described in Example 1 was followed but using MeOH/NH$_3$/H$_2$O. Unlike Examples 1–3, the polar solvent was discontinuous and the non-polar solvent was the continuous phase in this example.

Table 5 summarizes the oil recovery results using the 50 mm ID Karr column. As illustrated, the hexane-to-seed ratio of 2.4 resulted in the highest oil recovery in the miscella (90.8) at an overall extraction efficiency was 95.7%. The highest miscella concentration was achieved at a hexane-to-seed ratio of 0.94, with an overall extraction efficiency of 90.7%. Using hexane as the continuous phase gave less satisfactory results (Table 5).

EXAMPLE 5

A Karr column, 10 cm in diameter and 3.5 m in effective extraction length was used for the extraction, as described in Example 1, except that hexane was used as the continuous phase and MeOH/NH$_3$/H$_2$O was used as the polar solvent. The plate spacing in the column was 10 cm, and an agitator stroke length of 3 cm and a frequency 80 cycles per minute was used.

The operating conditions and the oil recoveries are summarized in Table 6. The highest oil recovery and overall extraction were 94.5% and 98.3% respectively.

EXAMPLE 6

The process described in Example 1 but using MeOH/NH$_3$/H$_2$O followed using commercially prepressed rapeseed cake prepared by the Vepex TM Krupp cold pressing process (Krupp GmbH, Hamburg), with an oil content of about 18% as the starting material. Prepressed seed was ground at a rate of 0.75 to 1.0 kg/min with a polar solvent-to-seed ratio of 2.1 (1 to 2.1 L/min). At the additional dilution step the same solvent was added at a solvent-to-seed ratio of 1.6 (1.2 to 1.6 L/min). The column used for the run was the Karr column of 10 cm in diameter and 3.55 m in extraction length. The hexane flowrate was 2.2 L/min ($R_{hexane}$=2.2 to 2.9). The results are tabulated in Table 7. The overall extraction efficiency was higher than 97%, and the oil recovery was stabilized at around 90% as from the miscella.

EXAMPLE 7

Soybeans were ground in EtOH/10% water (v/v) in a Szego mill at a solvent-to-seed ratio of 2.5. For example, 5 kg of soybean was treated with 12.5 L solvent, as described above. In contrast to canola processing, there was no additional dilution step. The column of 5 cm in diameter and 1.73 m in effecitve extraction lengths was used for the runs; the results are given in Table 8. The oil recovery was 98% and the meal protein content at a hexane-to-soy ratio of 3.2 was about 60%.

TABLE 1

Experimental Conditions for 5 cm ID Karr Column.

| Run Number | Hexane flowrate (L·min$^{-1}$) | Flowrate of the polar phase (L·min$^{-1}$) | Total throughput rate (L·min$^{-1}$) | Hexane-to-seed ratio (L·kg$^{-1}$) |
|---|---|---|---|---|
| 1 | 1.0 | 1.0 | 2.0 | 6.7 |
| 2 | 2.0 | 2.0 | 4.0 | 6.7 |
| 3 | 1.5 | 2.5 | 4.0 | 4.0 |
| 4 | 2.0 | 3.0 | 5.0 | 4.4 |
| 5 | 0.5 | 1.5 | 2.0 | 2.2 |
| 6 | 1.0 | 3.0 | 4.0 | 2.2 |

TABLE 2

Column Extraction Efficiencies.

| Run Number | Total throughput rate (L·min$^{-1}$) | Time of run (min) | Miscella oil content (weight %) | Oil content of the polar solvent (weight %) | Residual oil in the meal$^a$ (%) | Protein content of meal$^b$ (%) | Oil recovery (%) | Overall extraction efficiency (%) |
|---|---|---|---|---|---|---|---|---|
| 1 | 2.0 | 25 | 30.0 | 3.1 | — | — | — | — |
|   |     | 35 | 34.1 | 3.4 | 2.7 | 37.90 | 93.9 | 96.5 |
|   |     | 30 | 13.6 | 3.3 | 2.3 | — | 94.4 | 97.0 |
| 2 | 4.0 | 40 | 18.6 | 3.4 | — | — | — | — |
|   |     | 50 | 19.7 | 2.7 | 1.8 | 43.72 | 95.5 | 97.7 |
| 3 | 4.0 | 30 | 16.2 | 3.1 | 2.8 | — | 94.0 | 96.4 |
|   |     | 40 | 18.2 | 2.9 | 2.7 | 42.33 | 94.4 | 96.5 |
| 4 | 5.0 | 65 | 13.5 | 3.2 | 2.8 | 43.92 | 94.0 | 96.4 |
|   |     | 85 | 15.3 | 3.2 | 2.9 | — | 93.9 | 96.2 |
| 5 | 2.0 | 25 | 38.8 | 3.0 | 2.9 | — | 94.1 | 96.2 |
|   |     | 35 | 39.4 | 2.4 | 2.8 | — | 94.5 | 96.4 |
| 6 | 4.0 | 25 | 29.3 | 3.0 | 2.4 | — | 94.6 | 96.9 |
|   |     | 35 | 34.0 | 2.4 | 2.9 | — | 94.7 | 96.2 |

$^a$the oil content of starting canola was 43.5%
$^b$the protein content of canola seed was 20.6% (N × 6.25)

TABLE 3

Column Conditions for Continuous MeOH/NH$_3$/H$_2$O Hexane Runs. (10 cm column)

| Run Number | Hexane flowrate (L·min$^{-1}$) | MeOH/NH$_3$H$_2$O flowrate (L·min$^{-1}$) | Ground seed flowrate (kg·min$^{-1}$) | Hexane-to-seed ratio (L·kg$^{-1}$) |
|---|---|---|---|---|
| 1 | 1.75 | 3.0 | 0.75/0.80 | 2.2 |
| 2 | 2.1 | 3.2 | 0.75/0.80 | 2.7 |
| 3 | 2.7 | 2.7 | 0.67 | 4.0 |
| 4 | 3.0 | 1.8 | 0.45 | 6.7 |
| 5 | 1.80 | 2.0 | 0.76 | 2.6 |

TABLE 4

Column Extraction Efficiencies for MeOH/NH$_3$/H$_2$O

| Run Number | Total throughput rate (L·min$^{-1}$) | Time of run (min) | Miscella oil content (weight %) | Residual oil in the MeOH/NH$_3$/H$_2$O solvent (weight %) | Residual$^a$ oil in the meal (weight %) | Protein content of meal (%) | Oil recovery (%) | Overall extraction efficiency (%) |
|---|---|---|---|---|---|---|---|---|
|   |     | 40 | 20.8 | 1.7 | 0.23 | — | 95.8 | 99.7 |
| 1 | 5.6 | 60 | 27.2 | — | — | — | — | — |
|   |     | 80 | 28.0 | 1.4 | 0.36 | 47.70 | 96.3 | 99.5 |
| 2 | 6.1 | 60 | 21.4 | 1.5 | — | 47.16 | — | — |
| 3 | 6.1 | 60 | 15.8 | 1.3 | — | 48.31 | — | — |

TABLE 4-continued

| | | | Column Extraction Efficiencies for MeOH/NH$_3$/H$_2$O | | | | |
|---|---|---|---|---|---|---|---|
| Run Number | Total throughput rate (L·min$^{-1}$) | Time of run (min) | Miscella oil content (weight %) | Residual oil in the MeOH/NH$_3$/H$_2$O solvent (weight %) | Residual[a] oil in the meal (weight %) | Protein content of meal (%) | Oil recovery (%) | Overall extraction efficiency (%) |
| 4 | 5.3 | 60 | 12.4 | — | — | 48.73 | — | — |
| 5 | 4.45 | 100 | 18.0 | 0.9 | 0.2 | — | 97.7 | 99.7 |

[a] the oil content of starting canola was 43.5%
[b] the protein content of canola seed was 20.6% (N × 6.25)

TABLE 5

Summary of the Oil Recovery Results Using Hexane as Continuous and MeOH/NH$_3$/H$_2$O as Dispersed Phase. (10 cm column)

| Run Number | Hexane-to-seed ratio (L·kg$^{-1}$) | Time of run (min) | Miscella oil content (g/100 mL hexane) | Oil recovery (%) | Overall extraction efficiency (%) |
|---|---|---|---|---|---|
| 1 | 3.2 | 60 | 12.0 | 85.5 | 92.4 |
| 2 | 2.9 | 60 | 16.8 | 84.8 | 93.9 |
| 3 | 2.4 | 60 | 24.2 | 90.8 | 95.7 |
| 4 | 1.8 | 60 | 25.9 | 86.9 | 94.1 |
| 5 | 0.94 | 60 | 29.6 | 81.0 | 90.7 |

TABLE 6

Oil Recovery Using the 10 cm × 355 cm Karr Column

| Total flow rate (L·min$^{-1}$) | Hexane-to-seed ratio (L·kg$^{-1}$) | Time of run (min.) | Miscella conc. (weight %) | Oil Content in the (MeOH/NH$_3$/H$_2$O) phase weight % | Residual oil in the meal[a] % | Oil recovery (%) | Overall extraction eff. % | Protein content of meal % | Glucosinolate content umole/g |
|---|---|---|---|---|---|---|---|---|---|
| 5.6 | 3.0 | 60 | 26.7 | 1.7 | 3.34 | 91.8 | 95.7 | 50.5 | 1.2 |
| " | " | 120 | — | 2.1 | 3.28 | 90.9 | 95.7 | — | 1.9 |
| " | " | 180 | 25.9 | 2.2 | 2.62 | 91.6 | 96.6 | — | 1.5 |
| " | " | 240 | 27.0 | 1.6 | 1.31 | 94.6 | 98.3 | — | 1.8 |

[a] the oil content of starting canola was 43.57%

TABLE 7

Oil Recovery from Prepressed Canola Seed. (10 cm column)

| Total flow rate (L·min$^{-1}$) | Time of run (min.) | Miscella conc. (weight %) | Oil Content in the (MeOH/NH$_3$/H$_2$O) phase weight % | Residual oil in the meal[a] % | Oil recovery (%) | Overall extraction eff. % | Protein content % | Glucosinolate content umole/g |
|---|---|---|---|---|---|---|---|---|
| 6.2 ± 0.5 | 25 | 5.8 | 1.7 | 0.14 | 89.8 | 99.3 | 50.3 | 1.5 |
| " | 40 | 5.9 | 1.6 | 0.45 | 88.9 | 97.9 | 49.3 | 1.5 |
| " | 55 | 9.0 | 1.3 | 0.57 | 90.0 | 97.4 | 50.2 | 1.5 |
| " | 70 | N/A | 1.3 | 0.45 | 90.6 | 97.9 | 50.5 | 1.5 |

[a] the oil content of the prepressed seed was 17.76%

TABLE 8

Oil Recovery and Protein Content of Soybean Extraction Using the EtOH/H$_2$O-Hexane System. (5 cm column)

| Description | Hexane-to-soybean ratio (L·kg$^{-1}$) | Oil recovery in the miscella (% of total)[a] | Meal protein content (%, dry basis) |
|---|---|---|---|
| 1 | 2.1 | 93 | 58.0 |
| 2 | 3.2 | 98 | 59.6 |
| 3 | 4.8 | 99 | 60.0 |
| 4 | 12.7 | ~100 | 61.2 |

[a] The oil content of the starting material was about 20%.

We claim:

1. A method of extracting components from solid particulate material comprising the steps of:
    mixing said particulate material with a first extraction solvent to provide a slurry;
    passing said slurry through an extraction zone;
    passing a second extraction solvent countercurrently to said slurry through said extraction zone, said second solvent having a different density than said first solvent and being substantially immiscible in said first solvent;
    wherein (i) said solid particulate material is an oil bearing seed selected from the group comprising rapeseed, canola, soy, sunflower, cottonseed, peanut and mustard seed; and (ii) one extraction solvent is non-polar and the other extraction solvent is polar.

2. The method of claim 2 wherein said seed particles are previously ground, pre-pressed, flaked, cracked or broken.

3. The method of claim 1 further comprising the step of removing said particulate materials from said first extraction solvent.

4. The method of claim 1 further comprising the step of separating oil extracted from said seed particles from said non-polar solvent.

5. The method of claim 1 wherein said polar solvent is selected from methanol, ethanol, isopropanol, acetone and solutions thereof.

6. The method of claim 1 wherein said non-polar solvent is selected from C$_5$ to C$_8$ aliphatics, ether and halogenated compounds.

7. The method of claim 6 wherein said non-polar solvent is hexane.

8. The method of claim 2 wherein said seed particles are ground rapeseed particles, said first solvent is a solution of methanol containing ammonia and water and said second solvent is hexane.

9. The method of claim 2 wherein said seed particles are ground soybean particles, said first solvent is aqueous ethanol, and said second solvent is hexane.

10. The method of claim 4 wherein the ratio of polar solvent to particulate material is between about 0.5:1 to 10:1.

11. The method of claim 10 wherein the ratio of polar solvent to particulate material is between about 2:1–3:1.

12. The method of claim 11 wherein the ratio of polar solvent to particulate material is about 2.5:1.

13. The method of claim 8 wherein said rapeseed is ground with said solution of methanol containing ammonia and water in a ratio of 2.5:1 and is then diluted with an additional amount of said solution to a ratio of 4:1 to 7:1.

14. The method of claim 4 wherein the ratio of nonpolar solvent to particulate material ratio is from 1:1 to 10:1 (v/w)

15. The method of claim 14 wherein the ratio of nonpolar solvent to particulate material is about 2.5:1–7:1 (v/w).

16. The method of claim 15 wherein the ratio of nonpolar solvent to particulate material is about 4:1.

17. The method of claim 1 wherein the median particle size of said particulate material is between 50–1000 $\mu$m.

18. The method of claim 5 wherein said polar solvent is in an aqueous solution of 10% (v/v) water solvent.

19. The method of claim 17 wherein the median particle size is between 115–460 $\mu$m.

20. The method of claim 2 wherein said seed particles are slurry ground after being mixed with said first extraction solvent.

* * * * *